(12) United States Patent
Lorch

(10) Patent No.: US 8,191,567 B2
(45) Date of Patent: Jun. 5, 2012

(54) MIXER CARTRIDGE

(75) Inventor: Werner Lorch, Schramberg (DE)

(73) Assignee: Hansgrohe AG, Schiltach (DE)

( * ) Notice: Subject to any disclaimer, the term of this patent is extended or adjusted under 35 U.S.C. 154(b) by 518 days.

(21) Appl. No.: 11/828,029

(22) Filed: Jul. 25, 2007

(65) Prior Publication Data
US 2008/0066813 A1 Mar. 20, 2008

(30) Foreign Application Priority Data

Jul. 31, 2006 (DE) .......................... 10 2006 036 148

(51) Int. Cl.
*F16K 25/00* (2006.01)
(52) U.S. Cl. ................. 137/315.13; 137/454.6; 251/172
(58) Field of Classification Search ............... 137/454.2, 137/454.6, 625.17, 625.4, 625.41, 315.11, 137/315.12, 315.13; 251/172, 363
See application file for complete search history.

(56) References Cited

U.S. PATENT DOCUMENTS

| | | | | |
|---|---|---|---|---|
| 4,610,268 A | * | 9/1986 | Knapp | 137/454.6 |
| 4,733,694 A | * | 3/1988 | Knapp | 137/625.17 |
| 4,921,016 A | * | 5/1990 | Gnauert et al. | 137/625.17 |
| 4,942,902 A | * | 7/1990 | Knapp | 137/625.17 |
| 4,981,156 A | * | 1/1991 | Nicklas et al. | 137/270 |
| 4,995,419 A | * | 2/1991 | Pawelzik et al. | 137/316 |
| 5,111,842 A | * | 5/1992 | Knapp | 137/454.6 |
| 5,195,555 A | * | 3/1993 | Knapp | 137/454.6 |
| 5,341,845 A | * | 8/1994 | Graber | 137/625.41 |
| 5,375,624 A | | 12/1994 | Knapp | |
| 5,806,552 A | | 9/1998 | Martin, Jr. | |
| 6,116,279 A | | 9/2000 | Pawelzik et al. | |
| 6,454,175 B1 | | 9/2002 | Lorch | |
| 6,886,578 B1 | * | 5/2005 | Knapp | 137/15.19 |

FOREIGN PATENT DOCUMENTS

| | | |
|---|---|---|
| DE | 3890735 T1 | 9/1989 |
| DE | 69315681 T2 | 6/1998 |
| DE | 693 15 681 T2 | 7/1998 |
| EP | 1 310 711 A2 | 5/2003 |
| EP | 1310711 A2 | 5/2003 |

OTHER PUBLICATIONS

German Search Report, Issued May 16, 2007.
Abstract printout of EP Patent No. 1 310 711.

* cited by examiner

*Primary Examiner* — John Rivell
*Assistant Examiner* — Kevin Murphy
(74) *Attorney, Agent, or Firm* — Duane Morris LLP

(57) ABSTRACT

A mixer cartridge for insertion into the basic body of a fitting contains a bottom making the water connection with the basic body of the fitting. This bottom is guided so as to be displaceable to some extent with respect to the cartridge housing. In the initial state, this bottom is positioned such that the seals present between it and the mixer system are compressed to an extent such that sufficient sealing-off takes place in the case of a low water pressure. It is arranged so as to be displaceable with respect to the cartridge housing in the direction of an increasing compression of these seals. Consequently, in the case of an increasing water pressure, a higher compression of the seals and therefore an increasing sealing action are made possible.

9 Claims, 3 Drawing Sheets

MIXER CARTRIDGE

The invention relates to a mixer cartridge for insertion into a sanitary fitting.

It is known to separate the actual sanitary fitting, which is to have a specific appearance, from the functioning of the mixing system in that receptacles, into which the mixer cartridges can be inserted, are formed in the sanitary fittings. These mixer cartridges contain, closed off on itself, a mixer system. Connection to the water conduits which issue in the receptacle of the fitting housing takes place with the aid of a bottom which closes off the mixer cartridge in the direction of the fitting housing.

Seals are present both between the bottom and the mixing system arranged inside the cartridge and between the bottom and the fitting housing. However, since the bottom is part of the cartridge housing, it is normally secured in a fixed position at a specific location on the cartridge housing. The seals in this case possess some prestress or a defined degree of compression which is coordinated such that correct sealing-off takes place at the water pressures which occur.

If the prestress is made too high, the mixing systems are sluggish. If the prestress is made too low, complete sealing-off under all pressures which possibly occur is not afforded.

In a known mixer cartridge of this type (U.S. Pat. No. 6,454,175), the bottom is secured to the end of the cartridge housing with the aid of latching projections. It contains in its top side and in its underside grooves for receiving a formed seal. In a further known mixing valve (U.S. Pat. No. 4,733,694) the bottom of the carriage is biased by a spring against the mixing cartridge.

The object on which the invention is based is to provide a mixer cartridge which, on the one hand, has ease of movement and, on the other hand, always allows complete sealing-off even in the case of very high water pressures.

To achieve this object, the invention proposes a mixer cartridge having the features mentioned in claim 1. Developments of the invention are the subject-matter of subclaims.

The limited movability of the cartridge bottom with respect to the cartridge housing makes it possible that, on the one hand, the different types of pressures can be taken into account in the definition of the limitation of movability. On the other hand, with a rising water pressure, increased compression of the seals can take place in that the cartridge bottom is pressure-loaded, overall, and approaches the cartridge housing. The increasing water pressure therefore not only acts on the seals with the effect of bypassing the seals, but also on the cartridge bottom which compresses the seals to a greater extent.

In particular, in a development, there may be provision for the maximum possible distance between the mixer system and the bottom, which is made possible by the limited movement, to correspond to an action upon the seals which is sufficient for a low water pressure. Thus, a loading or compression of the seals which is sufficient for low water pressures is set. The mixing system thereby remains with ease of movement.

In a development of the invention, there may be provision for the bottom of the mixer cartridge to be formed on a bottom component which has a sleeve portion surrounding the cartridge housing. Cartridge housings are normally at least approximately cylindrical, specifically normally circular-cylindrical. The bottom closing off the cartridge housing is in this case arranged on one end face. So that movability between the bottom and cartridge housing can be controlled more effectively, the sleeve portion is provided, which can bear directly or indirectly against the outer surface of the cartridge housing.

In a development of the invention, there may be provision for a sliding sleeve, which is displaceable with respect to the bottom component, to be arranged between the outer surface of the cartridge housing and the sleeve portion of the bottom component. This sliding sleeve can be coordinated, in the selection of material, with the material of the bottom component, so that only low friction occurs here, while the material of the cartridge housing does not need to take any account of this.

There may be provision for the sliding sleeve to be connected fixedly to the cartridge housing at least in the pull-off direction of the bottom.

According to the invention, in a development, a latching means may be arranged between the sliding sleeve and the bottom component and serves for causing the sleeve portion of the bottom component to be latched in during assembly, but, on the other hand, prevents a pull-off.

For this purpose, at least one latching projection which engages into an orifice of the sleeve portion may be arranged on the sliding sleeve.

The appearance of the mixer cartridge according to the invention is, for example, such that the sliding sleeve is arranged on the outside of the cartridge housing, specifically so as to bear sealingly against the cartridge housing. The sleeve portion of the bottom component then bears against the outside of the sliding sleeve. Limited movement is afforded between the sliding sleeve and the bottom component.

In a further development of the invention, there may be provision for the sliding sleeve to have an outwardly directed projecting flange which forms a bearing face for an end edge of the sleeve portion of the bottom component. Thus, limited movement is brought about or, in other words, the movement of the bottom in the direction of the cartridge housing is limited. It can thereby be ensured that an excessive compression of seals does not occur.

In order to ensure that the sliding sleeve is connected fixedly to the cartridge housing in the pull-off direction of the bottom, the cartridge housing may have a shoulder on which an end edge of the sliding sleeve is supported.

According to the invention, in a development, there may be provision for the cartridge to be securable in a fixed axial position in the receptacle of the sanitary fitting.

This axial position can be achieved, for example, by a union nut being used. This union nut engages with its union engagement surface on the sliding sleeve, preferably on the outwardly projecting flange of the latter. The sliding sleeve has, on the underside of the flange, ribs distributed on the circumference. These ribs can then rest on the outside of the fitting housing, and the sliding sleeve is retained in this position by the union nut.

In a further development of the invention, there may be provision for the bottom to engage in each case with a nipple into the orifices of the receptacles of the sanitary fitting. The free end edge of this nipple forms in this case a piston surface which displaces the bottom in the event of an increase in water pressure.

Further features, details and advantages of the invention may be gathered from the claims and the abstract, the wording of both of which becomes the content of the description by reference, from the following description of preferred embodiments of the invention and from the drawing in which:

Figure 1:
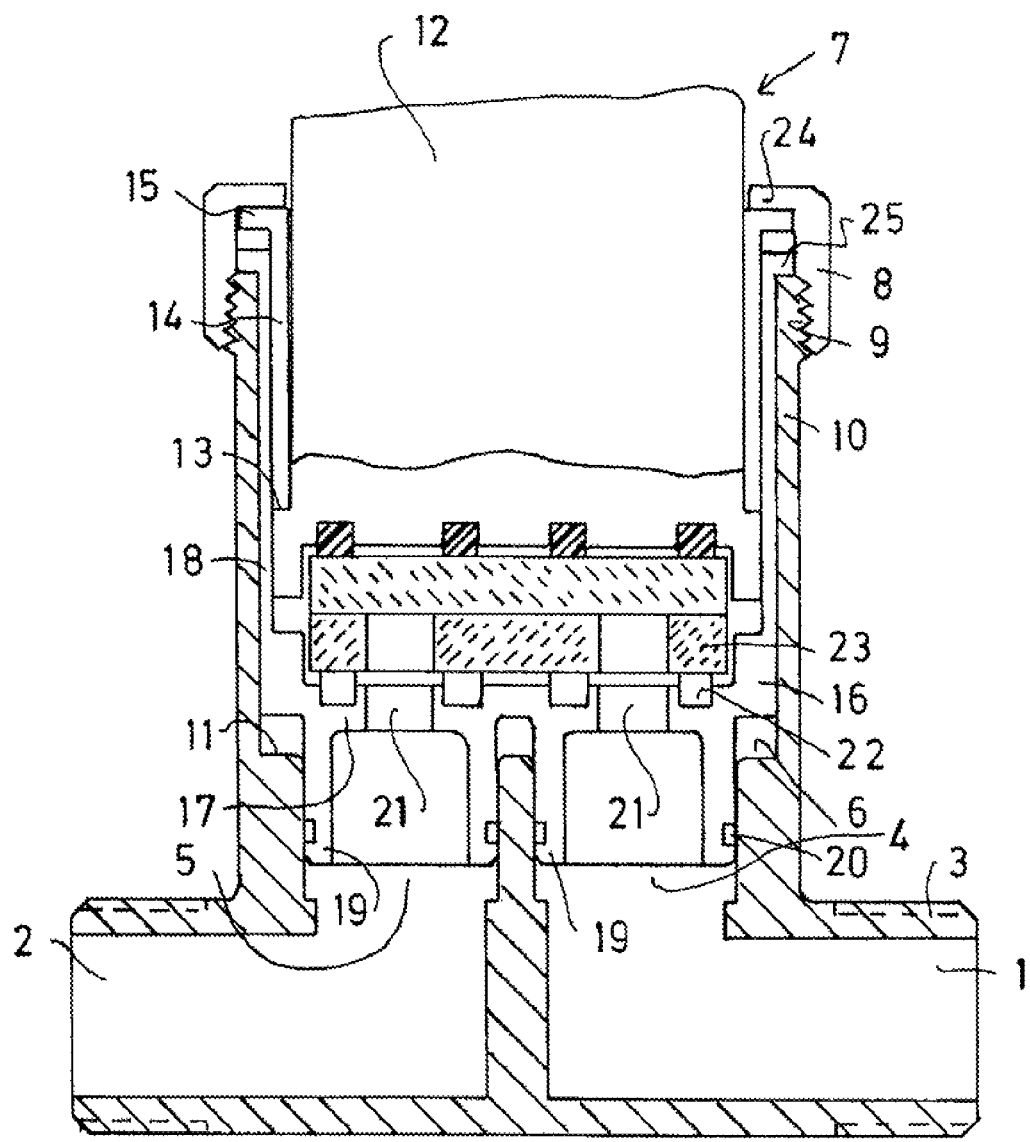
FIG. 1 shows an axial section through a sanitary fitting with an inserted mixer cartridge only partially illustrated.

FIG. 1 shows a section through a sanitary fitting with two water inlets 1 and 2 which are designed as nipples with an external thread 3. The basic fitting body also has a third connection which is an outlet and which cannot be seen in the section of the figure.

The two inlets 1, 2 lead into cylindrical orifices 4 and 5 which run perpendicularly with respect to the plane of the inlets 1, 2. The said orifices issue in a reception space 6 for a mixer cartridge 7 which is inserted in this reception space 6. The orifices 4 and 5 issue in an end face 11 of the reception space 6, the said end face forming a shoulder at the edge of the reception space 6. The mixer cartridge 7 is secured in the reception space 6 with the aid of a union nut 8. The mixer cartridge 7 accommodates all the functional parts for the mixing, shut-off and, if appropriate, distribution of the mix water.

The union nut 8 engages into an external thread 9 which is formed at the end of the component 10 containing the reception space 6.

The mixer cartridge 7 is illustrated partially in section in FIG. 1. It has a cartridge housing 12 having an essentially circular-cylindrical cross section which widens in the end region to form a shoulder 13. A sliding sleeve 14 is supported on this shoulder 13 and in the region of its end facing away from the shoulder 13 contains an outwardly directed flange 15. The sliding sleeve 14 is secured by the shoulder 13 downwards in FIG. 1, that is to say in the direction of the end face 11 of the reception space 6, against being pulled off. The mixer cartridge has, in its end region facing the basic fitting body, a bottom component 16 which contains the actual bottom 17 and a sleeve portion 18. The sleeve portion 18 bears against the outside of the sliding sleeve 15 and is displaceable with respect to the latter to a certain extent. The bottom 17 contains for each orifice 4, 5 a nipple 19 which engages into the orifice 4 or 5 and in its outer surface contains a groove 20 for a seal. The interior of each nipple 19 has a passage orifice 21 which leads into the interior of the cartridge housing 7. In the illustration of FIG. 1, the mixer cartridge 7 is illustrated in the closed state. On that side of the bottom 17 which faces the mixer system in the cartridge housing 12, each passage orifice 21 is surrounded by a groove 22 for the insertion of a seal. The orifices 21 are thereby sealed off with respect to one another, so that the water can pass through the orifices 21 into the distributor disc 23 of the mixer system.

The position of the mixer cartridge 7 in the reception space 6 is determined by the union nut 8 being screwed onto the external thread 9 until blocked. The union nut 8 engages with its inwardly directed flange 24 on the flange 15 of the sliding sleeve 14, the said flange, in turn, lying on the shoulder 13 of the cartridge housing 12. On the underside of the flange 15 are formed, distributed over the circumference, axial ribs which engage through slots of the bottom component 18 and lie on the end edge of the component 10, containing the reception space 6, of the fitting housing. These ribs are also illustrated later. In this position, the axial position of the bottom component 16 is defined by the bearing of an outer flange 25 of the sleeve portion 18 on the outer end of the component 10 containing the reception space 6.

The position is selected such that the seals between the bottom 17 and the mixer system are compressed somewhat, in order to ensure sufficient sealing-off at low water pressures.

The bottom component 16 is displaceable with respect to the sliding sleeve 15 to a certain extent. There is a certain distance, illustrated in FIG. 1, between the top side of the flange 25 of the sleeve portion 18 of the bottom component 16 and the underside of the flange 15 of the sliding sleeve 14. The bottom component 16 and therefore the bottom 17 can be displaced by this amount in the direction of the mixer cartridge. This displacement is at the same time the direction in which an increase in compression of the various seals is brought about.

When the water pressure in the inlets 1, 2 increases, the bottom component is displaced in the direction of the axially secured mixer cartridge 7. This occurs due to the piston surfaces which are present on the end faces of the nipples 19. This displacement leads to a higher compression and therefore prestress of the various seals, so that sufficient sealing-off is then afforded also for the higher water pressure.

Figure 2:
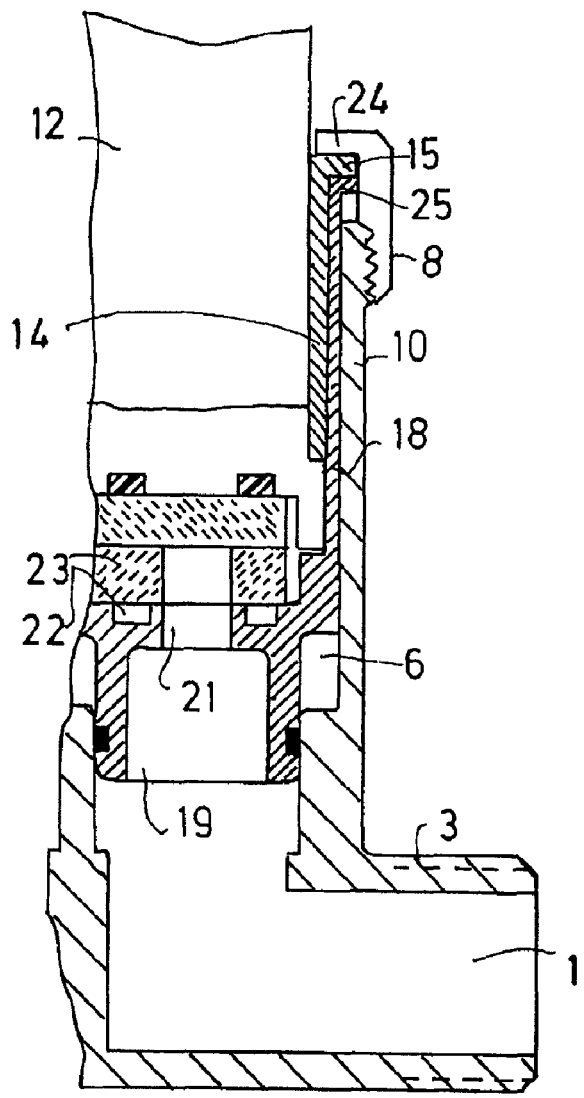
FIG. 2 shows a part-illustration of FIG. 1 with an increased water pressure.

This situation is illustrated in FIG. 2 which shows a part-section similar to FIG. 1, but with an increased water pressure. The bottom component 16 is displaced until the flange 25 of the sleeve portion 18 comes to bear against the underside of the flange 15 of the sliding sleeve 14, see top right in FIG. 2. The sliding sleeve 14 and the bottom component 16 are produced from materials which allow easy displacement, so that this displacement just described is not impeded.

Securing the bottom component 16 to the cartridge housing 12 will now be described with reference to FIG. 3. The sliding sleeve 15, in the region of its flange end, has an outwardly directed projection 30 at a distance from the flange 15. The sleeve portion 18 of the bottom component 16 has, directly below its flange 25 arranged at the end, a perforation 31 which extends over part of the circumference. The projection 30 of the sliding sleeve 15 is designed obliquely on its side facing away from the flange 15. During assembly, the bottom component 16 can be pushed onto the sliding sleeve 14, the outer end of the latter sliding on the obliquely running part of the projection 30 until the projection 30 can snap into the perforation 31. In the position illustrated in FIG. 3, the top side 32 of the projection 30 bears against the top edge of the perforation 31. This is the position of maximum distance of the bottom 17 of the mixer cartridge 7 from the cartridge housing 12. The bottom component 16 can be shifted out of this position nearer to the cartridge housing 12, to be precise until the two flanges 25 and 15 bear one against the other.

Figure 3:
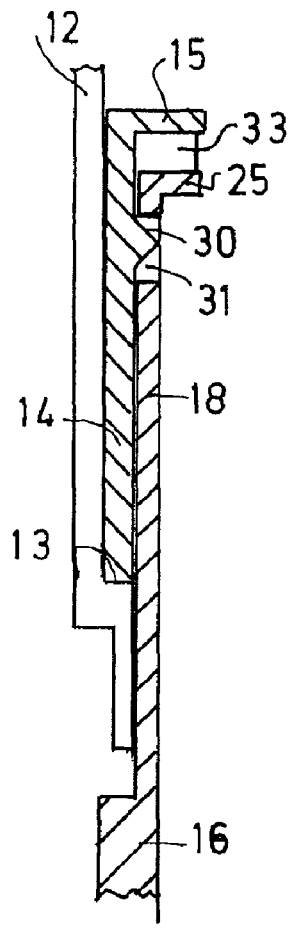
FIG. 3 shows an enlarged part-section through the illustration of FIG. 2.
Figure 4:
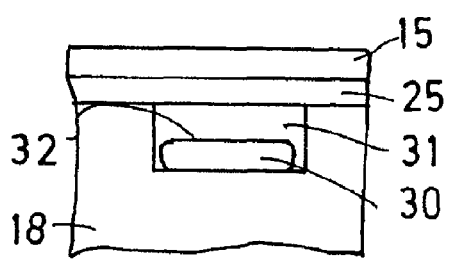
FIG. 4 shows a partial side view of the latching device in the displaced state.
Figure 5:
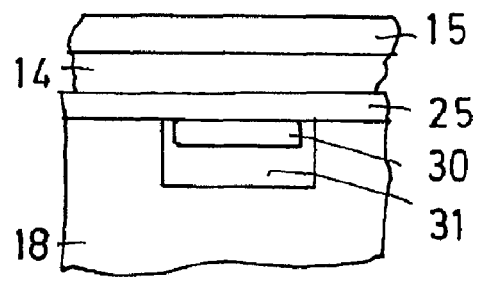
FIG. 5 shows a partial side view of the latching device in the initial state.

FIG. 5 shows, from the right in FIG. 3, the position illustrated in FIG. 3. The flange 15 of the sliding sleeve 14 is at a distance from the flange 25 of the sleeve portion 18 of the bottom component 16. The projection 30 bears against the upper boundary edge of the perforation 31. If, then, the bottom 17 is displaced by an increase in water pressure, this ultimately gives rise to the situation which is illustrated in FIG. 4. The two flanges 15 and 25 bear one against the other, and the projection 30 bears against the lower edge of the perforation 31.

Figure 6:
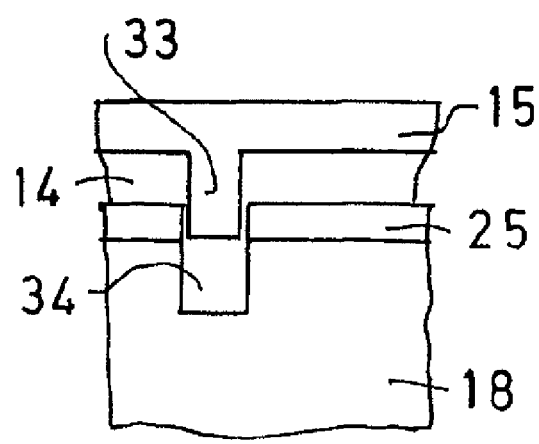
FIG. 6 shows an illustration, corresponding to FIG. 5, from another direction.
Figure 7:
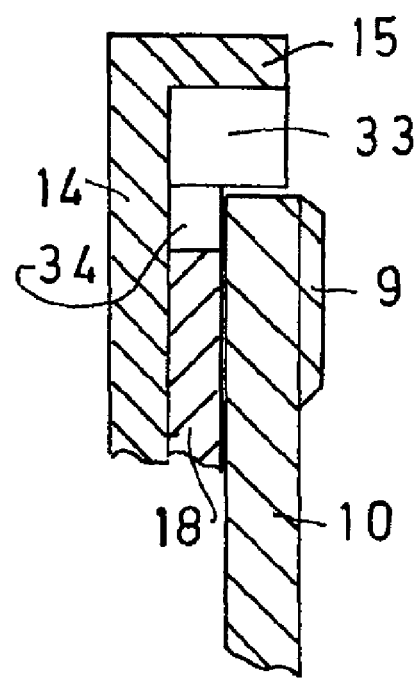
FIG. 7 shows a part-section similar to FIG. 3.

Now to FIG. 6. This shows a view similar to FIG. 5, to be precise in the radial direction towards the sliding sleeve 14 and bottom component 18 plugged one into the other. On the underside of the flange 15 of the sliding sleeve 14 is formed at this location a rib 33 which may, for example, be in one piece with the flange 15. At the same location, in the bottom component 18, starting from its end edge, is formed a slot 34 which, starting from the end edge, is dimensioned with a depth such that, when the two flanges 15, 25 bear one against the other, the rib 33 has room in the slot 34. The reason for these ribs 33 is that they can lie on the end edge of the component 10 containing the receptacle 6, so that screwing on the union nut ensures that the sliding sleeve 14 and consequently the mixer cartridge are secured axially. This lying of the rib 33 on the end edge is illustrated in FIG. 7, a small interspace also being left for reasons of clearer illustration.

The invention claimed is:

1. A mixer cartridge, comprising:
   a sanitary fitting component (10) containing a cartridge housing, a mixer system arranged in the cartridge housing, a bottom closing off the cartridge housing in the direction of a receptacle for a sanitary fitting and having passages for water, and with at least one seal arranged between the mixer system and the cartridge bottom,
   wherein the cartridge bottom is formed on a bottom component which has a sleeve portion surrounding the cartridge housing;
   further comprising a sliding sleeve, permitting relative displacement in said direction between the cartridge housing and the bottom component, the sliding sleeve comprising a sleeve portion arranged outside of the cartridge housing, between the outer surface of the cartridge housing and the sleeve portion of the bottom component, the sliding sleeve having an outwardly directed flange;
   wherein a position of the cartridge housing in the receptacle of the sanitary fitting component is determined by a union nut threaded onto an external thread of the sanitary fitting component (10) and engaging by an inwardly directed flange with the outwardly directed flange of the sliding sleeve; and
   wherein a rib (33) is formed on an underside of the outwardly directed flange (15) of the sliding sleeve (14), the rib lying against an end edge of the sanitary fitting component (10), and wherein the sleeve portion (18) of the bottom component (16) is formed with a slot (34) corresponding to the rib (33);
   wherein the bottom component is held on the cartridge housing so as to be moveable to a limited extent in a direction toward and away from the cartridge housing.

2. The mixer cartridge according to claim 1, wherein a maximum distance between the mixer system and the cartridge bottom which is allowed by the limited extent of movement corresponds to an action upon the at least one seal which is sufficient in case of low water pressure.

3. The mixer cartridge according to claim 1, wherein a radial inside of the sleeve portion of the bottom component bears against a radial outside of the sliding sleeve.

4. The mixer cartridge according to claim 1, wherein the sliding sleeve is connected fixedly to the cartridge housing at least in a pull-off direction of the cartridge bottom.

5. The mixer cartridge according to claim 1, wherein a latching means which permits the limited extent of movement is arranged between the sliding sleeve and the bottom component.

6. The mixer cartridge according to claim 1, wherein at least one latching projection which engages into an orifice of the sleeve portion of the bottom component is arranged on the sliding sleeve.

7. The mixer cartridge according to claim 1, wherein the outwardly directed flange of the sliding sleeve forms a bearing face for an end edge of the sleeve portion of the bottom component.

8. The mixer cartridge according to claim 1, wherein the sliding sleeve is supported on a shoulder of the cartridge housing.

9. The mixer cartridge according to claim 1, wherein the mixer cartridge bottom engages in each case with a nipple into orifices of the receptacle of a basic body of the fitting.

\* \* \* \* \*